United States Patent [19]
Paulos et al.

[11] 4,321,946
[45] Mar. 30, 1982

[54] ARMATURE POSITION MONITORING AND CONTROL DEVICE

[76] Inventors: Louis B. Paulos, 9616 Yolanda Ave., Northridge, Calif. 91324; Donald L. Huebsch, 3716 Prestwick Dr., Los Angeles, Calif. 90027

[21] Appl. No.: 135,647

[22] Filed: Mar. 31, 1980

[51] Int. Cl.³ .................... F16K 37/00; F16K 31/06; G08B 21/00
[52] U.S. Cl. .................... 137/554; 251/139; 166/65 M; 340/635
[58] Field of Search .................... 320/15, 16; 307/148, 307/66; 251/139, 138, 129; 166/65 M; 137/554; 340/635; 361/154, 159

[56] References Cited
U.S. PATENT DOCUMENTS

| Re. 30,110 | 10/1979 | Huebsch et al. | 166/65 M |
| 3,032,107 | 5/1962 | Rumble et al. | 166/65 M |
| 3,678,298 | 7/1972 | Dyer | 361/154 X |
| 3,740,615 | 6/1973 | Vigini | 361/159 |
| 3,789,876 | 2/1974 | Kempton et al. | 137/554 |
| 3,854,695 | 12/1974 | Baugh | 251/129 |

*Primary Examiner*—A. Michael Chambers
*Attorney, Agent, or Firm*—Sellers and Brace

[57] ABSTRACT

An armature position monitor for determining the position of an armature within a solenoid and any device controlled thereby. By way of example, the monitor is useful to indicate the position of a solenoid controlled valve such as a sub-surface safety cutoff valve by detecting and utilizing a signal generated in a solenoid actuator for the armature upon the movement thereof toward or away from its extended position to control the power supplied to the solenoid.

28 Claims, 2 Drawing Figures

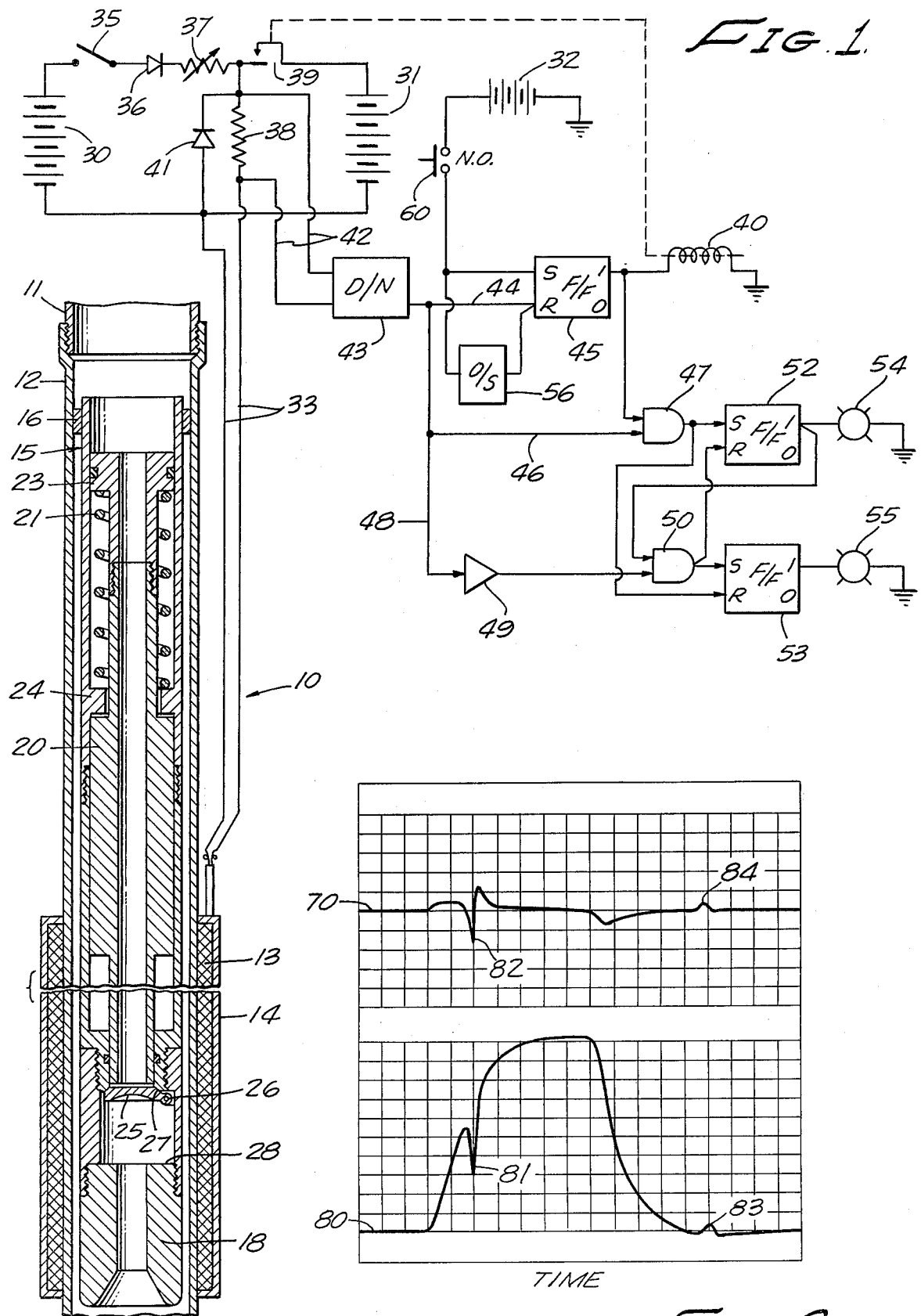

ARMATURE POSITION MONITORING AND CONTROL DEVICE

This invention relates to monitoring and control devices and more particularly to a unique means for indicating the position of a solenoid armature and of any device actuated by the armature movement.

BACKGROUND OF THE INVENTION

Solenoid operated devices are in widespread use, including applications wherein it is highly important for supervisory personnel to know whether the device being actuated actually responds to energization or deenergization of the related solenoid. Various expedients have been resorted to heretofore to acknowledge such operation but these require a communication facility separate from and in addition to the power supply circuit for the solenoid. Such separate communication devices include electrical, pneumatic and/or hydraulic expedients subject to obvious shortcomings and disadvantages avoided by this invention.

SUMMARY OF THE INVENTION

The many shortcomings and disadvantages of prior armature position monitors and indicator devices are avoided by this invention. This highly desirable objective is accomplished by a monitoring device connected in series with the power supply and the armature solenoid which device is designed to detect and utilize the transitory signal generated in the solenoid during the brief interval the armature is moving between its two extreme positions. The monitor includes means for distinguishing between the solenoid energizing potential and the back electromotive force (EMF) generated during movement of the armature relative to the solenoid. In an exemplar of the invention, the monitor is utilized to indicate the position of the valve in a magnetically actuated safety cutoff valve typically mounted in an earth bore to control the flow of fluid from an underground depository. However, there are countless other applications for the invention monitoring system.

Accordingly, it is a primary object of this invention to provide a unique armature position monitor responsive to a signal generated in a solenoid during movement of an armature relative thereto.

Another object of the invention is the provision of a solenoid actuated device provided with means for utilizing the back EMF to modify the power applied to the solenoid.

Another object of the invention is the provision of a monitoring device for detecting and utilizing a momentary change in the current applied to a solenoid magnetic actuator as the actuator armature moves relative to the solenoid.

Another object of the invention is the provision of means for detecting and indicating the position of a magnetically operated device at a point remote from the device.

Another object of the invention is the provision of a magnetically operated safety cutoff valve for a sub-surface fluid depository which monitoring device is connected in series with the power supply and solenoid for the cutoff valve and is operable to indicate whether the valve is open or closed.

Another object of the invention is the provision of new and improved electrical monitoring means for indicating the position of a remotely located magnetically operated mechanism.

These and other more specific objects will appear upon reading the following specification and claims and upon considering in connection therewith the attached drawing to which they relate.

Referring now to the drawing in which a preferred embodiment of the invention is illustrated:

FIG. 1 is a cross sectional view of an illustrative embodiment of a magnetically actuated device in circuit with its power supply schematic and the logic diagram of the solid state monitoring device therefor; and FIG. 2 shows two recorder traces the lower trace showing the current supply to the solenoid for a complete operating cycle, and the upper trace showing the contemporaneous output signal of the monitor differentiating network.

Referring initially to FIG. 1, there is shown by way of example a magnetically operated safety cutoff valve designated generally 10 of the type typically installed in an earth bore between the opposite ends of the flow tubing 11. One end of tubing 11 terminates at ground level and the other end is in communication with a sub-surface fluid depository. Cutoff valve 10 corresponds with the construction disclosed in detail in our U.S. Pat. No. Re. 30,110, granted Oct. 9th, 1979. This assembly has a non-magnetic tubular housing 12 the threaded opposite ends of which are coupled to adjacent upper and lower sections of tubing 11. Embracing housing 12 is a solenoid coil 13 encased in a housing 14. The valve sub-assembly 15 extends axially within housing 12 and is held separably coupled thereto by a conventional wireline operated disconnect coupling 16. All tubular components of sub-assembly 15 are of non-magnetic material with the exception of the tubular pole piece 18 threaded to its lower end.

Reciprocably supported within sub-assembly 15 is a tubular armature 20 of magnetic material here shown as spring biased to its extended position by a compression spring 21 having its upper end seated against an enlargement 23 of the armature and its lower end seated against an annular stop 24. A flapper valve 25 is pivotably supported by pin 26 in sub-assembly 15 in an area spaced axially from pole piece 18. Valve 25 normally closes against a seat 27 to close off flow through tubing 11.

It will be observed that solenoid 13 embraces the reduced diameter adjacent end of armature 20 and is movable axially through valve seat 27 in a direction to pivot valve 25 to its open position when the armature comes to rest in its retracted position against the end 28 of pole piece 18. When so positioned the armature shields valve 25 from the flow which takes place through the tubular pole piece, armature 20 and tubing 11.

The power supply for the armature and its position monitoring device will now be described. As herein shown, the power supply is divided into three units comprising a 12 volt battery 30, an 84 volt battery 31 and a 5 volt battery 32, the first two batteries serving to energize solenoid 13, and battery 32 serving to energize the solid state monitoring components. Battery 30 supplies adequate power adjustable by rheostat 37 to hold armature 20 retracted and and valve 25 open under normal operating conditions after valve 25 is open. However, the opening cycle requires greater power and this is provided by the higher potential available in battery 31. Battery 30 is connected across solenoid leads 33 by switch 35, a diode 36, rheostat 37, and monitoring resistor 38. The relatively high voltage battery 31 is connected across solenoid leads 33 commonly with battery 30 and at a point between rheostat 37 and resistor 38 by the normally open contact 39 of relay 40. A bridging diode 41 is connected in series with monitoring resistor 38 and solenoid 13.

The logic component sub-assembly has input leads 42 interconnecting the opposite ends of resistor 38 and a differentiating network 43. The output of network 43 has a lead 44 connected to the reset terminal R of flip flop 45, a lead 46 connected to one input of AND gate 47 and a third lead 48 connected to the input of inverter amplifier 49. The output of amplifier 49 is channelled to one input of AND gate 50. The output of flip flop 45 is connected to the coil of relay 40 and to the second input of AND gage 47. The output of gate 47 is connected to the set terminal S of flip flop 52 and to the reset terminal R of flip flop 53. The output of flip flop 52 is channelled to a lamp or other type indicator device 54 and to the second input terminal of AND gate 50. The output of gate 50 is connected to the reset terminal R of flip flop 52 and to the set terminal S of flip flop 53. The output of flip flop 53 is connected to a lamp or other indicator device 55. The one shot component 56 has its output pulse channelled to the reset terminal R of flip flop 45. The logic input connections to set terminal S of flip flop 45 and input to the one shot 56 include a normally open switch 60 which is closed momentarily to initiate operation of the magnetically operated cutoff valve assembly 10. The power supply and grounding terminals for each of the solid state components are not shown but will be understood as present by persons skilled in the electronic art.

FIG. 2 shows an upper recorder trace 70 representing the output signal produced by differentiating network 43 during a typical operating cycle of solenoid 13 and its armature 20, involving energization of the solenoid followed very shortly thereafter by its de-energization. The lower recorder trace 80 shows the time related current flow through the solenoid which increases generally exponentially during a one to two second energizing cycle and which decays exponentially during de-energization. However, during energization, trace 80 has a momentary sharp or precipitous drop indicated at 81 caused by the back EMF generated in the solenoid while the armature is in movement between its extended and retracted positions. The potential drop at resistor 38 caused by this back EMF is differentiated in network 43 producing an output signal represented at 82 in trace 70.

Likewise, during return of armature 20 from its retracted to its extended position, a relatively small but readily sensed EMF of reverse polarity represented at 83 on trace 80 causes a distinctive reverse polarity drop across resistor 38 and results in a small but characteristic output pulse 84 from network 43. Output pulses 82 and 84 are utilized to perform multiple functions in a manner which will now be described in a typical operating cycle.

OPERATION

Let it be assumed that switch 35 is open and that cutoff valve assembly 10 is de-energized and valve 25 is closed. To initiate operation the operator closes battery switch 35 and then momentarily closes switch 60. The closing of switch 35 supplies power to solenoid 13 but in an amount inadequeate to open valve 25. The momentary closing of switch 60 creates a logic level to set flip flop 45 thereby supplying power to relay 40 to close its contact 39 thereby providing high power to solenoid 13. In addition, a first logic level input is provided to AND gate 47. Also the momentary closing of switch 60 activates the one shot component 56 to provide an output pulse after a short preselected interval, which time period will be discussed later. During this interval, the current supplied to solenoid 13 by battery 30 is greatly increased by the high voltage provided by battery 31 thereby providing a very powerful energizing flux to armature 20 which rapidly moves to its retracted position against the upper end 28 of pole piece 18. This movement of armature 20 through the flux field dynamically generates a back electromotive force (EMF) in solenoid 13 of opposite polarity to the energizing potential provided by batteries 30 and 31. The back EMF thereby dynamically generated in coil 13 produces a momentary sharp drop in voltage at resistor 38. This voltage drop is sensed by and differentiated in network 43 to provide an output pulse 82 (FIG. 2) which provides a logic level to reset flip flop 45 via lead 44 to provide a second logic level to AND gate 47 via lead 46 and to provide a logic input pulse to the inverter amplifier 49. However, the latter is not activated since the received impulse is of the wrong polarity.

It will therefore be recognized that relay 40 is now de-activated by the reset pulse thereby terminating the high current to the solenoid then being supplied in major part from battery 31. This heavy current is no longer needed since the potential supplied by battery 30 is quite adequate to hold the armature retracted and effective to lock valve 25 open. Diode 36 protects battery 30 from reverse current caused by the different potentials, between batteries 30 and 31 when they are connected in parallel (closure of both relay contact 39 and switch 35). Prior to the resetting of flip flop 45 by the logic output of 43 via lead 44, the logic output of 43 provides the required second logic level input via lead 46 simultaneously with the output level of flip flop 45 to AND gate 47. The logic level of AND gate 47 then provides an output logic level to the set terminal S of flip flop 52 thereby persistently activating the indicator 54 to indicate that the armature is in its retracted position and that valve 25 is open. At the same time the output logic level from flip flop 52 is transmitted to one of the logic level inputs to AND gate 50. However, the pulse from inverter amplifier 49 into the second input to AND gate 50 is of the wrong polarity. Hence, no output from AND gate 50.

In the event armature 20 does not move, pulse 82 is not generated. Therefore after a pre-set time period set into oneshot 56, one shot 56 will provide the necessary logic level to reset flip flop 45 thereby de-energizing relay coil 40 and opening relay contact 39, de-energizing solenoid coil 13. This eliminates over heating of solenoid coil 13 due to excessive current over a longer duration of time. Note that flip flop 52 was not set to energize indicator 54. Hence the logic system is still in the same state prior to the momentary closure of contact 60.

The system continues to function in this manner until such time as the power supply to solenoid 13 fails, or switch 35 is manually opened. In these circumstances the retrograde movement of armature 20 generates a back EMF pulse 83 of reverse polarity which is sensed across resistor 38 in combination with diode 41 by differentiating network 43. A minute but readily detected reverse polarity pulse 84 then issues from network 43 and is amplified by inverter 49 to provide a second input level of correct polarity to AND gate 50. This gate is now activated and provides an output level to set flip flop 53 thereby persistently activating indicator 55 as well as resetting flip flop 52 and deactivating indicator 54. The operator is thereby apprised of the fact that the armature has returned to its extended position and that valve 25 is now closed.

In the event the armature returns to its extended position without surface intervention, the monitor system will still function as just described and the indicator 55 will be reactivated to show that the armature has returned to its extended position wherein the valve 25 is closed. Indicator 54 will then be deactivated.

While the particular armature position monitoring and control device herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. That improvement in a solenoid actuated mechanism which comprises:
    a solenoid connectable to a power source and provided with armature means movable between retracted and extended positions as said solenoid is energized and de-energized;
    actuatable means movable between extended and retracted positions by said solenoid and including said armature means operable to generate a momentary back EMF signal in said solenoid during said movement of said armature means relative to said solenoid in response to either energization or de-energization thereof; and
    monitoring means operatively connected to said solenoid and including means for utilizing said momentary EMF signal to provide an indication of the armature position.

2. That improvement defined in claim 1 characterized in that said monitoring means is operable to detect said back EMF signal in the power supply leads to said solenoid at a station remote from said solenoid mechanism.

3. That improvement defined in claim 1 characterized in that said monitoring means includes indicator means operable to indicate the position of said actuatable means at any time.

4. That improvement defined in claim 1 characterized in the provision of means for differentiating the change in current caused by the back EMF signal generated in said solenoid as said armature means moves thereby to provide a signal distinctive of armature movement, and means for utilizing said distinctive signal to indicate actuation of said actuatable means.

5. That improvement defined in claim 1 characterized in that said signal utilizing means includes means for indicating the position of said armature means.

6. That improvement defined in claim 1 characterized in that said armature means includes means biasing the same to the extended position thereof when said solenoid is de-energized.

7. That improvement defined in claim 6 characterized in that said biasing means comprises spring means.

8. That improvement defined in claim 1 characterized in that said actuatable means comprises valve means operable between open and closed position by said armature means.

9. That improvement defined in claim 8 characterized in that said valve means includes spring means operable to close said valve means when said armature means is in one position thereof.

10. That improvement defined in claim 8 characterized in that said armature means is tubular and arranged to form a portion of the flow path through said valve means when in its open position.

11. That improvement defined in claim 8 characterized in that said signal utilizing means includes indicator means for indicating the position occupied by said valve means.

12. That improvement in a safety cutoff valve assembly adapted to be mounted in an earth bore to control fluid flow which comprises:
    a non-magnetic tubular housing embraced by a solenoid adapted to be connected to a source of power;
    tubular armature means reciprocably supported within and axially of said housing for movement between retracted and extended positions in response to either energization or de-energization of said solenoid;
    valve means movably supported within said housing for movement between open and closed positions by said armature means; and
    monitoring means responsive to movement of said armature means to utilize a momentary back EMF signal generated in said solenoid during the movement of said armature means in either axial direction to provide a persisting indication of the movement of said armature means to the extended or retracted position thereof.

13. That improvement defined in claim 12 characterized in that said monitoring means includes indicator means operable to indicate the position of said valve means.

14. That improvement defined in claim 12 characterized in that said monitoring means includes means operable to indicate whether said valve means is open or closed.

15. That improvement defined in claim 12 characterized in that said source of power for said solenoid includes means for energizing said solenoid with a relatively high potential while said armature means is moving toward the retracted position thereof and for thereafter decreasing the energizing potential to a relatively low value adequate to hold said armature means in its retracted position.

16. That improvement defined in claim 12 characterized in that said armature means is normally biased to the extended position thereof.

17. That improvement defined in claim 12 characterized in that said armature means is normally spring biased to one of said positions thereof.

18. That improvement defined in claim 12 characterized in that said valve means is normally spring biased to one position thereof and movable to the other position thereof by said armature means.

19. That improvement defined in claim 15 characterized in the provision of means for automatically terminating the supply of said relatively high potential to said solenoid if said armature means fails to move to the retracted position thereof.

20. That improvement defined in claim 15 characterized in the provision of means for automatically terminating the supply of relatively high potential to said solenoid not later than a predetermined time after energizing the same with said relatively high potential.

21. That improvement in a magnetically operated valve which comprises:
   a valve housing having valve means movable between open and closed position;
   solenoid controlled armature means operatively associated with said means movable between retracted and extended positions depending on whether said solenoid is energized or de-energized; and
   DC-powered valve position monitoring means operatively connected to and powered by the power supply for said solenoid controlled armature means including means for detecting and providing a persistent indication of the position of said valve in response to the generation of a momentary back EMF in said solenoid during the movement of said armature means in response to either energization or de-energization of said solenoid thereby providing a persistent indication that the position of said valve means has shifted between the open and closed positions thereof.

22. That improvement defined in claim 21 characterized in that said monitoring means for said valve means is connected in circuit with the power supply to said solenoid.

23. That improvement defined in claim 21 characterized in that said monitoring means for said valve means includes means for differentiating the current change caused by said momentarily generated back EMF thereby to provide a distinctive signal representative of armature movement to activate said valve position indicator means.

24. That improvement defined in claim 21 characterized in the provision of a relatively high voltage power supply and a relatively low voltage power supply for said solenoid, and said monitoring means including means for utilizing said high voltage power supply for moving said armature means from the extended to the retracted position thereof and for thereafter utilizing said low voltage power supply to hold said armature means extended.

25. That improvement defined in claim 21 characterized in that said armature means includes means normally biasing said armature means to the extended position thereof.

26. That improvement defined in claim 21 characterized in the provision of means biasing said valve means toward closed position.

27. That improvement defined in claim 23 characterized in the provision of time delay means for automatically terminating said relatively high voltage to said solenoid if said solenoid controlled armature means fails to move to the retracted position thereof during the time period of said time delay means.

28. That improvement defined in claim 24 characterized in the provision of time delay means for automatically terminating said relatively high voltage power supply to said solenoid not later than a predetermined time after energizing the same with said relatively high potential power supply.

* * * * *